(12) United States Patent
Xie et al.

(10) Patent No.: US 11,967,051 B2
(45) Date of Patent: Apr. 23, 2024

(54) IMAGE FUSION METHOD AND PORTABLE TERMINAL

(71) Applicant: ARASHI VISION INC., Guangdong (CN)

(72) Inventors: Liang Xie, Shenzhen (CN); Chaoyi Xie, Shenzhen (CN)

(73) Assignee: ARASHI VISION INC. (CN)

( * ) Notice: Subject to any disclaimer, the term of this patent is extended or adjusted under 35 U.S.C. 154(b) by 315 days.

(21) Appl. No.: 17/437,742

(22) PCT Filed: May 9, 2020

(86) PCT No.: PCT/CN2020/089299
§ 371 (c)(1),
(2) Date: Sep. 9, 2021

(87) PCT Pub. No.: WO2020/182230
PCT Pub. Date: Sep. 17, 2020

(65) Prior Publication Data
US 2022/0148129 A1    May 12, 2022

(30) Foreign Application Priority Data
Mar. 11, 2019  (CN) .......................... 201910178581.0

(51) Int. Cl.
*G06T 5/50* (2006.01)
*G06T 5/00* (2006.01)

(52) U.S. Cl.
CPC ................ *G06T 5/50* (2013.01); *G06T 5/006* (2013.01); *G06T 2207/20052* (2013.01); *G06T 2207/20221* (2013.01)

(58) Field of Classification Search
CPC ....... G06T 2200/32; G06T 2207/20052; G06T 2207/20221; G06T 3/4038; G06T 5/006; G06T 5/50
See application file for complete search history.

(56) References Cited

U.S. PATENT DOCUMENTS 9,589,350 B1  3/2017  Kozko
11,089,234 B2 * 8/2021 Sytnik .................. H04N 23/71
(Continued)

FOREIGN PATENT DOCUMENTS

CN    107292838 A    10/2017
CN    107945148 A    4/2018
(Continued)

OTHER PUBLICATIONS

International Search Report dated Aug. 14, 2020 issued in corresponding Patent Application No. PCT/CN2020/089299 w/English Translation (4 pages).
(Continued)

*Primary Examiner* — Tsung Yin Tsai
(74) *Attorney, Agent, or Firm* — Polsinelli PC

(57) ABSTRACT

Provided are an image fusion method and apparatus, and a portable terminal. The method comprises: obtaining several aligned images; respectively calculating gradient information of each image; setting a mask image of each image, and generating a target gradient image; performing a gradient operation on the target gradient image, and obtaining a target Laplacian image; performing a deconvolution transform on the Laplacian image, and generating a fused panoramic image. The technical solution generates a Laplacian image by performing gradient information calculations on several images, and then performs a deconvolution transform to generate a fused panoramic image, thereby eliminating image stitching color differences, and implementing a better image fusion effect.

18 Claims, 3 Drawing Sheets

(56) References Cited

U.S. PATENT DOCUMENTS

| 2005/0063608 A1* | 3/2005 | Clarke | G06T 3/4038 |
| | | | 382/284 |
| 2009/0169102 A1* | 7/2009 | Zhang | G06T 3/4061 |
| | | | 382/167 |
| 2010/0246976 A1* | 9/2010 | Tolstaya | H04N 1/3876 |
| | | | 382/218 |
| 2012/0038751 A1* | 2/2012 | Yuan | G06T 7/571 |
| | | | 348/51 |
| 2016/0048952 A1* | 2/2016 | Tezaur | G06T 5/004 |
| | | | 382/255 |
| 2020/0106944 A1* | 4/2020 | Sytnik | H04N 23/741 |

FOREIGN PATENT DOCUMENTS

| CN | 108416732 A | 8/2018 |
| CN | 109934772 A | 6/2019 |
| JP | 2016519968 A | 7/2016 |
| JP | 2018524830 A | 8/2018 |

OTHER PUBLICATIONS

Yingen Xiong et al., "Fast Panorama Stitching for High-Quality Panoramic Images on Mobile Phones", IEEE Transactions on Consumer Electronics, vol. 56, No. 2, May 2010, 9 pages.

Anat Levin et al., "Seamless Image Stitching in the Gradient Domain", School of Computer Science and Engineering, The Hebrew University of Jerusalem, ECCV 2004, LNCS 3024, 13 pages.

Matthew Uyttendaele et al., "Eliminating Ghosting and Exposure Artifacts in Image Mosaics", 0-7695-1272-0/01 2001 IEEE, 8 pages.

Debabrata Ghosh et al., "A survey on image mosaicing techniques", Department of Electrical Engineering, University of North Dakota, Feb. 2, 2015, 11 pages.

Achala Pandey et al., "Image mosaicing: A deeper insight", National Institute of Technology Rourkela, May 4, 2017, 22 pages.

Yuta Nakagawa, "Extraction of Human Regions for Generating Self-Portrait Panoramic Photos", Information Processing Society of Japan Research Report, vol. 2013-EC-28 No. 8, May 10, 2013, pp. 1-6.

Yu Tang et al., "Image Stitching with Efficient Brightness Fusion and Automatic Content Awareness", Graduate School of Computer Science and Engineering, The University of Aizu, Sep. 28, 2022, 8 pages.

European Search Report issued in corresponding EP Application No. 20768934.0, dated Oct. 27, 2022.

Japanese Office Action issued in corresponding JP Application No. 2021-554650, dated Nov. 21, 2020.

* cited by examiner

IMAGE FUSION METHOD AND PORTABLE TERMINAL

CROSS REFERENCE TO RELATED APPLICATION

The present application is a National Phase of International Application No. PCT/CN2020/089299, filed on May 9, 2020 which claims priority to Chinese Patent Application No. 201910178581.0, filed on Mar. 11, 2019 and entitled "Image Fusion Method and Portable Terminal", and the content of which are herein incorporated by reference in their entireties.

TECHNICAL FIELD

The present disclosure relates to the field of images or videos, and particularly to an image fusion method and a portable terminal.

BACKGROUND

The image stitching or panoramic image technology refers to splicing a series of images with overlapping areas into one image with a wide viewing angle, closing to the original image, with little distortion and no obvious stitching lines, in order to meet the demand of people for browsing the panoramic image.

At present, there are already many image fusion algorithms by which the overlapping parts in the same scene image can be extracted and images can be quickly stitched into one panoramic image, and a satisfactory fusion result is obtained. One method is to use wavelet to perform multiscale fusion. But this method only performs local fusion processing in the overlapping areas, and cannot guarantee the global naturalness of the image. Another method is to use the gradient domain fusion method to stitch the images, which can reduce the influence of the color difference between the source images on the fusion result. However, for images with obvious differences in color and brightness, the above two methods may result in distortion in the merged panoramic image.

SUMMARY

Technical Problem

The present disclosure provides an image method, a computer-readable storage medium and a portable terminal, which aims to eliminate the chromatic aberration of stitched image and achieve a good image fusion effect.

Technical Solution

In the first aspect of the present disclosure, an image fusion method is provided, which includes:
acquiring a plurality of aligned images;
calculating gradient information of each image respectively;
setting a mask image of each image and generating a target gradient image;
performing a gradient operation on the target gradient image to obtain a target Laplacian image;
performing a deconvolution transform on the Laplacian image to generate a fused panoramic image.

In the second aspect of the present disclosure, a computer-readable storage medium is provided, on which a computer program is stored, the computer program, when executed by a processor, implements the steps of the image fusion method in the first aspect of the present disclosure.

In the third aspect of the present disclosure, a portable terminal is provided, which includes:
one or more processors;
a memory; and
one or more computer programs, in which the one or more computer programs are stored in the memory and configured to be executed by the one or more processors, the processors, when executing the computer programs, implement the steps of the image fusion method in the first aspect of the present disclosure.

Advantages

In the present disclosure, the Laplacian image is generated by calculating the gradient information of a number of images, and then the deconvolution transform is performed to generate the fused panoramic image, which eliminates the color difference in the stitched images and achieves a good fusion effect of the images.

DETAILED DESCRIPTION

In order to make the objectives, technical solution, and advantages of the present disclosure clearer, the present disclosure will be described in detail with reference to the accompanying drawings and embodiments. It should be appreciated that the specific embodiments described here are only used for explaining the present disclosure, rather than limiting the present disclosure.

In order to illustrate the technical solution of the present disclosure, specific embodiments are used for description below.

Embodiment I

Figure 1:
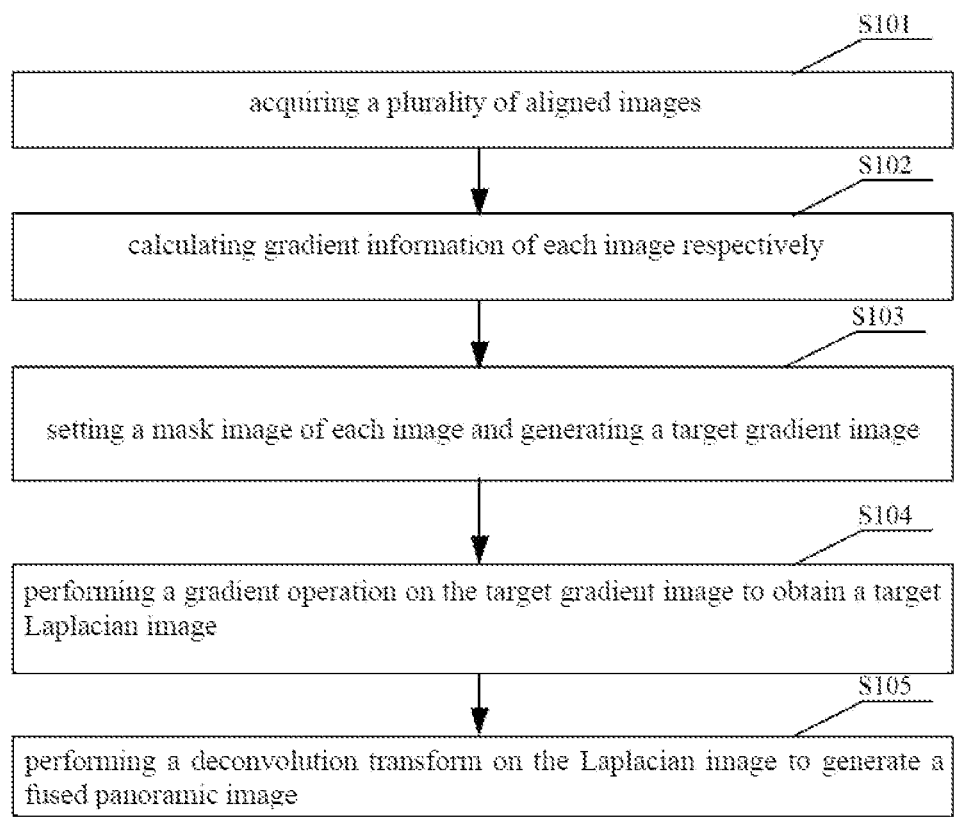
FIG. 1 is a flow chart showing an image fusion method according to Embodiment I of the present disclosure.

Referring to FIG. 1, an image fusion method provided by the embodiment I of the present disclosure includes the following steps.

S101: a number of aligned images are acquired.

A number of aligned images may be images taken by an ordinary camera from multiple angles of view, or video frames of a video;

There are n images, and n≥2. The n images can be stitched into one panoramic image, and the images are aligned to indicate that in the n images, any pixel has a corresponding pixel in the stitched panoramic image.

The stitching can be implemented by camera external parameter calibration, feature point matching or optical flow alignment methods.

S102: gradient information of each image is calculated respectively.

Each image is down-sampled sequentially to obtain a corresponding down-sampled image; the down-sampling is 1/m times of the original image, with m≥40.

Horizontal forward gradient information, vertical forward gradient information, horizontal backward gradient information and vertical backward gradient information of each down-sampled image are calculated respectively.

Calculation formulas for the gradient information of pixel coordinate (u,v) are as follows.

As for the horizontal forward gradient information $g_x$, a calculation formula is:

$$g_x(u, v) = \begin{cases} I(u+1, v) - I(u, v) & \text{if } u < \text{Width} - 1 \\ 0 & \text{if } u = \text{Width} - 1 \end{cases}. \quad (1)$$

As for the vertical forward gradient information $g_y$, a calculation formula is:

$$g_y(u, v) = \begin{cases} I(u, v+1) - I(u, v) & \text{if } u < \text{Height} - 1 \\ 0 & \text{if } u = \text{Height} - 1 \end{cases}. \quad (2)$$

As for the horizontal backward gradient information $g_x^b$, a calculation formula is:

$$g_x^b(u, v) = \begin{cases} g_x(u-1, v) & \text{if } u > 0 \\ 0 & \text{if } u = 0 \end{cases}. \quad (3)$$

As for the vertical backward gradient information $g_y^b$, a calculation formula is:

$$g_y^b(u, v) = \begin{cases} g_y(u, v-1) & \text{if } v > 0 \\ 0 & \text{if } v = 0 \end{cases}. \quad (4)$$

(u,v) is the coordinate of a pixel, I is a pixel value, g is gradient information of the pixel, Width is a width of the image, and Height is a height of the image.

S103: a mask image of each image is set, and a target gradient image is generated.

The mask image of each image is set according to an area of effective information of the image in the panoramic image; a specific mask image can be selected according to a specific stitching scheme. For the stitching scheme with fixed stitching seams, for example, a video sequence shot by a fixed camera, a fixed mask can be selected due to the same the stitching method. For a scheme of dynamically adjusting the stitching seams, such as using images taken by different cameras to perform the stitching and fusion, the stitching method may change, accordingly a corresponding mask can be calculated respectively, which is referred to as a dynamic mask.

A new four channels image with the same length and width as the panoramic image is created. The four channels are respectively configured to store the horizontal forward gradient information, the vertical forward gradient information, the horizontal backward gradient information, and the vertical backward gradient information.

The gradient information of the four channels of an area covered by a mask image of each image is copied to the newly created four channels image to generate the target gradient image.

S104: a gradient operation is performed on the target gradient image to obtain a target Laplacian image.

The Laplacian image is calculated according to the four channels gradient information of the target gradient image, and a calculation formula is:

$$L(u,v) = g_x(u,v) - g_x^b(u,v) + g_y(u,v) - g_y^b(u,v). \quad (5)$$

For the Laplacian image, a small component of a brightness value of the original image is added, and a calculation formula is:

$$L'(u, v) = L(u, v) + \varepsilon \sum_{i=1}^{N} I_i(u, v) M_i(u, v), \quad (6)$$

where, N is a total number of images, $I_i$ is the i-th original image, $M_i$ is a mask of the i-th image, and the pixel value is 1 when the pixel is effective pixel, otherwise the pixel value is 0; $M_i$ ensures that for each pixel (u,v), only one of N images has the pixel value of 1, and the rest have the pixel value of 0.

S105: a deconvolution transformation is performed on the Laplacian image to obtain a fused image.

The Laplacian image L' can be regarded as generated by convolving the panoramic image with the following template, the template is:

0 1 0
1 -4+ε 1.
0 1 0

Therefore, the above template is utilized to perform the Fourier transform on the Laplacian image L'. According to the convolution theorem, this step can be completed in the frequency domain. A Fourier spectrum of L' is divided by a Fourier spectrum of the above template, and then an inverse Fourier transform is performed thereon; a ratio graph is obtained according to a ratio difference between the original image and the fused image; then the ratio graph is up-sampled by m times, and then multiplied by image points of multiple corresponding original images to obtain a number of aligned images; then a number of aligned images are fused with corresponding mask images together to obtain a final panoramic image.

The deconvolution transform is performed on the Laplacian image L' to obtain the fused image, which can be converted in the frequency domain of the image. Because the above two Fourier spectra are both plural, in order to reduce the calculation and storage, discrete cosine transform is utilized to simplify the calculation.

Figure 2:
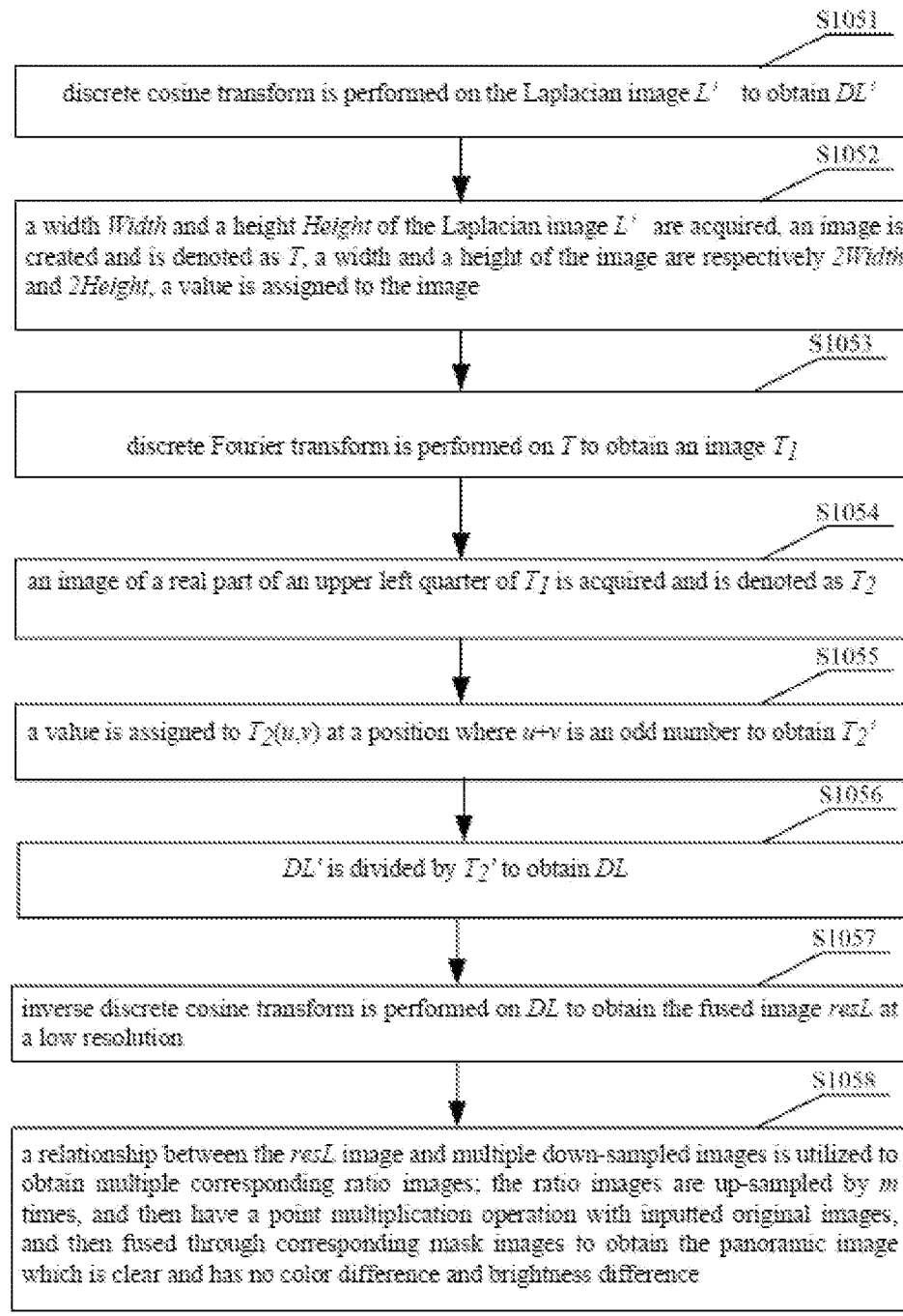
FIG. 2 is a flow chart showing an image deconvolution transformation method according to the Embodiment I of the present disclosure.

Referring to FIG. 2, the specific steps of deconvolution transform of the images include following steps.

S1051: discrete cosine transform is performed on the Laplacian image L' to obtain DL'.

S1052: a width Width and a height Height of the Laplacian image L' are acquired, an image is created and is denoted as T, a width and a height of the image are respectively 2Width and 2Height, a value of (−4+ε) is assigned to a center position (Width, Height) of the image, a value of 1 is assigned to positions (Width+1, Height), (Width−1, Height), (Width, Height+1), (Width, Height−1) respectively, and a value of 0 is assigned to other positions.

S1053: discrete Fourier transform is performed on T to obtain an image $T_1$.

S1054: an image of a real part of an upper left quarter of T (0≤u<Width, 0≤v<Height) is acquired and is denoted as $T_2$.

S1055: $T_2(u,v)$ is changed to $-T_2(u,v)$ at a position where u+v is an odd number to obtain $T_2'(u,v)$, as shown in a following formula (7):

$$T_2'(u, v) = \begin{cases} T_2(u, v) & u+v \text{ is even} \\ -T_2(u, v) & u+v \text{ is odd} \end{cases}. \quad (7)$$

S1056: DL' is divided by $T_2'$ to obtain DL, as shown in a following formula (8):

$$DL(u, v) = \frac{DL'(u, v)}{T_2'(u, v)}. \quad (8)$$

S1057: inverse discrete cosine transform is performed on DL to obtain the fused image resL at a low resolution.

S1058: a relationship between the resL image and multiple down-sampled images is utilized to obtain multiple corresponding ratio images; the ratio images are up-sampled by m times, and then have a point multiplication operation with inputted original images, and then fused through corresponding mask images to obtain the panoramic image which is clear and has no color difference and brightness difference.

It should be noted that for an image with less details, because the image is relatively smooth, the discrete Fourier transform data is concentrated in the middle low-frequency signal area, and the discrete cosine transform data is concentrated in the upper left corner. It is almost impossible to see the advantages of the discrete cosine transform. However, for an image with rich details, the data after the discrete Fourier transform is very divergent, and the data after the discrete cosine transform is still relatively concentrated. If the original image is also restored from the frequency spectrum, it is more reasonable to choose the discrete cosine transform, because the discrete cosine transform only needs to store fewer data points, the calculation and storage capacity can be reduced.

In the present disclosure, the Laplacian image is generated by calculating the gradient information of a number of images, and then the deconvolution transform is performed to generate the fused panoramic image, which eliminates the color difference in the stitched images and achieves a good fusion effect of the images.

Embodiment II

The second embodiment of the present disclosure provides a computer-readable storage medium which stores a computer program, and the computer program, when executed by a processor, performs the steps of the image fusion method as provided in the embodiment I of the present disclosure. The computer-readable storage medium can be a non-transitory computer-readable storage medium.

Embodiment III

Figure 3:
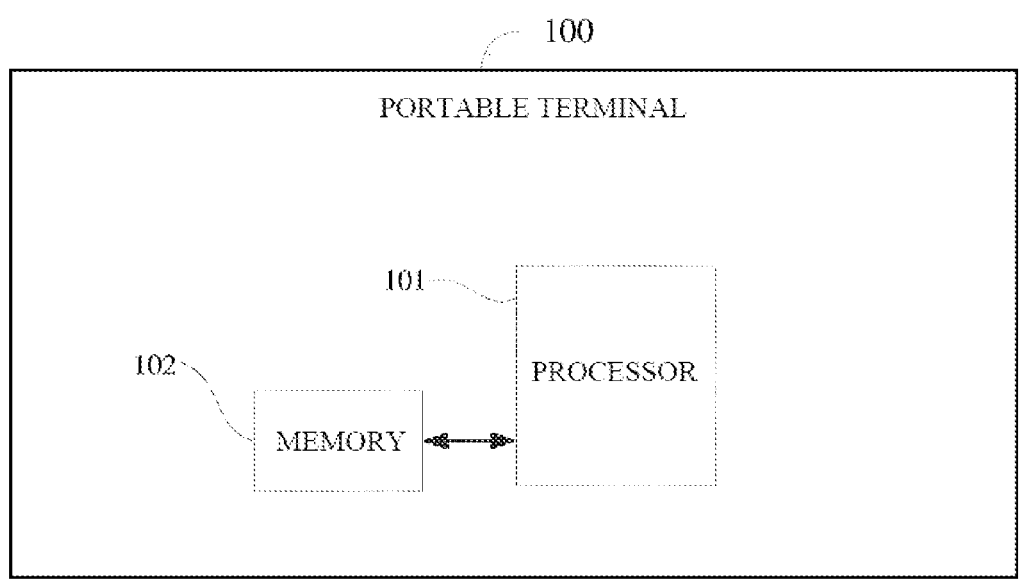
FIG. 3 is a schematic structure diagram of a portable terminal according to Embodiment III of the present disclosure.

FIG. 3 shows a specific structure block diagram of a portable terminal provided in embodiment III of the present disclosure. The portable terminal 100 includes: one or more processors 101, a memory 102, and one or more computer programs; the processor 101 is connected to the memory 102 by a bus; the one or more computer programs are stored in the memory 102, and are configured to be executed by the one or more processors 101; and the processor 101, when executing the computer programs, implements the steps of the image fusion method provided in the embodiment I of the present disclosure.

In the embodiments of the present disclosure, those of ordinary skill in the art can understand that all or part of the steps in the methods of the above-mentioned embodiments can be implemented by a program instructing relevant hardware, and the program can be stored in a computer-readable storage medium. The storage medium mentioned is, such as ROM/RAM, a magnetic disk, an optical disk, etc.

The above are merely the preferred embodiments of the present disclosure and are not intended to limit the present disclosure. Any modification, equivalent replacement and improvement made within the spirit and principle of the present disclosure shall be regarded as the protection scope of the present disclosure.

What is claimed is:

1. An image fusion method, comprising:
acquiring a plurality of aligned images;
calculating gradient information of each image respectively;
setting a mask image of each image and generating a target gradient image;
performing a gradient operation on the target gradient image to obtain a target Laplacian image;
performing a deconvolution transform on the Laplacian image to generate a fused panoramic image;
wherein,
the plurality of aligned images are capable of being stitched into one panoramic image, and a number of the aligned images is equal to n, with n≥2;
the aligned images represent that any pixel in the n aligned images corresponds to a pixel in the panoramic image obtained by stitching;
wherein the calculating the gradient information of each image respectively comprises:
down-sampling each image sequentially to obtain a corresponding down-sampled image;
calculating horizontal forward gradient information, vertical forward gradient information, horizontal backward gradient information and vertical backward gradient information of each down-sampled image respectively.

2. The method according to claim 1,
wherein the calculating the gradient information of a coordinate (u,v) of a pixel comprises:
calculating the horizontal forward gradient information $g_x$ with a formula (1):

$$g_x(u, v) = \begin{cases} I(u+1, v) - I(u, v) & \text{if } u < \text{Width} - 1 \\ 0 & \text{if } u = \text{Width} - 1 \end{cases}; \quad (1)$$

calculating the vertical forward gradient information $g_y$ with a formula (2):

$$g_y(u, v) = \begin{cases} I(u, v+1) - I(u, v) & \text{if } u < \text{Height} - 1 \\ 0 & \text{if } u = \text{Height} - 1 \end{cases}; \quad (2)$$

calculating the horizontal backward gradient information $g_x^b$ with a formula (3):

$$g_x^b(u, v) = \begin{cases} g_x(u-1, v) & \text{if } u > 0 \\ 0 & \text{if } u = 0 \end{cases}; \quad (3)$$

calculating the vertical backward gradient information $g_y^b$ with a formula (4):

$$g_y^b(u, v) = \begin{cases} g_y(u, v-1) & \text{if } v > 0 \\ 0 & \text{if } v = 0 \end{cases}; \quad (4)$$

wherein, (u,v) is the coordinate of the pixel, I is a pixel value, g is the gradient information of the pixel, Width is a width of an image, and Height is a height of an image.

3. The method according to claim 1, wherein the setting the mask image of each image and generating the target gradient image comprises setting the mask image of each image through a fixed mask or a dynamic mask according to different stitching manners.

4. The method according to claim 3, wherein the setting the mask image of each image through the dynamic mask and generating the target gradient image comprises:
creating a four channels image with the same length and width as the panoramic image, wherein the four channels are configured to store the horizontal forward gradient information, the vertical forward gradient information, the horizontal backward gradient information, and the vertical backward gradient information;
copying gradient information of an area covered by the mask image of each image to the created image and generating the target gradient image.

5. The method according to claim 1, wherein the performing the gradient operation on the target gradient image to obtain the target Laplacian image comprises:
calculating the Laplacian image according to four gradient information of the target gradient image by using a calculation formula (5):

$$L(u,v) = g_x(u,v) - g_x^b(u,v) + g_y(u,v) - g_y^b(u,v); \quad (5)$$

for the Laplacian image, adding a small component of a brightness value of the original image by using a calculation formula (6):

$$L'(u, v) = L(u, v) + \varepsilon \sum_{i=1}^{N} I_i(u, v) M_i(u, v); \quad (6)$$

wherein, N is a total number of images, $I_i$ is the i-th original image, is a mask image of the i-th image, the pixel value is 1 when the pixel is effective pixel, otherwise the pixel value is 0; $M_i$ ensures that for each pixel (u,v), only one of N images has the pixel value of 1, and the rest have the pixel value of 0.

6. The method according to claim 1, wherein the performing the deconvolution transform on the Laplacian image to obtain the fused image comprises:
performing discrete cosine transform on the Laplacian image L' to obtain DL';
acquiring a width Width and a height Height of the Laplacian image L created an image and denoting the image as T, a width and a height of the image being respectively 2Width and 2Height, assigning a value of (−4+ε) to a center position (Width, Height) of the image, assigning a value of 1 to positions (Width+1, Height), (Width−1, Height), (Width, Height+1), (Width, Height−1) respectively, and assigning a value of 0 to other positions of the image;
performing discrete Fourier transform on T to obtain an image $T_1$;
acquiring an image of a real part of an upper left quarter of $T_1$ (0≤u<Width, 0≤v<Height) and denoting the image as $T_2$;
changing $T_2(u,v)$ to $-T_2(u,v)$ at a position where u+v is an odd number to obtain $T_2'(u,v)$ by using a formula (7):

$$T_2'(u, v) = \begin{cases} T_2(u, v) & u+v \text{ is even} \\ -T_2(u, v) & u+v \text{ is odd} \end{cases}; \quad (7)$$

DL' is divided by $T_2'$ to obtain DL, as shown in a following formula (8):

$$DL(u, v) = \frac{DL'(u, v)}{T_2'(u, v)}; \quad (8)$$

performing inverse discrete cosine transform on DL to obtain the fused image resL at a low resolution;
using a relationship between the resL image and multiple down-sampled images to obtain multiple corresponding ratio images, up-sampling the ratio images by m times, and performing a point multiplication operation between the up-sampled ratio images and inputted original images, and then fusing through corresponding mask images to obtain the panoramic image which is clear and has no color difference and brightness difference.

7. A non-transitory computer-readable storage medium, on which a computer program is stored, which when executed by a processor, cause the processor to perform operations comprising:
acquire a plurality of aligned images;
calculate gradient information of each image respectively;
set a mask image of each image and generate a target gradient image;
perform a gradient operation on the target gradient image to obtain a target Laplacian image;
perform a deconvolution transform on the Laplacian image to generate a fused panoramic image;
wherein,
the plurality of aligned images are capable of being stitched into one panoramic image, and a number of the aligned images is equal to n, with n≥2;
the aligned images represent that any pixel in the n aligned images corresponds to a pixel in the panoramic image obtained by stitching;
wherein the calculate the gradient information of each image respectively comprises:
down-sample each image sequentially to obtain a corresponding down-sampled image;
calculate horizontal forward gradient information, vertical forward gradient information, horizontal backward gradient information and vertical backward gradient information of each down-sampled image respectively.

8. The non-transitory computer-readable storage medium according to claim 7,
wherein the calculating the gradient information of a coordinate (u,v) of a pixel comprises:

calculating the horizontal forward gradient information $g_x$ with a formula (1):

$$g_x(u, v) = \begin{cases} I(u+1, v) - I(u, v) & \text{if } u < \text{Width} - 1 \\ 0 & \text{if } u = \text{Width} - 1 \end{cases}; \quad (1)$$

calculating the vertical forward gradient information $g_y$ with a formula (2):

$$g_y(u, v) = \begin{cases} I(u, v+1) - I(u, v) & \text{if } u < \text{Height} - 1 \\ 0 & \text{if } u = \text{Height} - 1 \end{cases}; \quad (2)$$

calculating the horizontal backward gradient information $g_x^b$ with a formula (3):

$$g_x^b(u, v) = \begin{cases} g_x(u-1, v) & \text{if } u > 0 \\ 0 & \text{if } u = 0 \end{cases}; \quad (3)$$

calculating the vertical backward gradient information $g_y^b$ with a formula (4):

$$g_y^b(u, v) = \begin{cases} g_y(u, v-1) & \text{if } v > 0 \\ 0 & \text{if } v = 0 \end{cases}; \quad (4)$$

wherein, (u,v) is the coordinate of the pixel, I is a pixel value, g is the gradient information of the pixel, Width is a width of an image, and Height is a height of an image.

9. The non-transitory computer-readable storage medium according to claim 7, wherein the setting the mask image of each image and generating the target gradient image comprises setting the mask image of each image through a fixed mask or a dynamic mask according to different stitching manners.

10. The non-transitory computer-readable storage medium according to claim 9, wherein the setting the mask image of each image through the dynamic mask and generating the target gradient image comprises:
creating a four channels image with the same length and width as the panoramic image, wherein the four channels are configured to store the horizontal forward gradient information, the vertical forward gradient information, the horizontal backward gradient information, and the vertical backward gradient information;
copying gradient information of an area covered by the mask image of each image to the created image and generating the target gradient image.

11. The non-transitory computer-readable storage medium according to claim 7, wherein the performing the gradient operation on the target gradient image to obtain the target Laplacian image comprises:
calculating the Laplacian image according to four gradient information of the target gradient image by using a calculation formula (5):

$$L(u,v) = g_x(u,v) - g_x^b(u,v) + g_y(u,v) - g_y^b(u,v); \quad (5)$$

for the Laplacian image, adding a small component of a brightness value of the original image by using a calculation formula (6):

$$L'(u, v) = L(u, v) + \varepsilon \sum_{i=1}^{N} I_i(u, v) M_i(u, v); \quad (6)$$

wherein, N is a total number of images, $I_i$ is the i-th original image, is a mask image of the i-th image, the pixel value is 1 when the pixel is effective pixel, otherwise the pixel value is 0; ensures that for each pixel (u,v), only one of N images has the pixel value of 1, and the rest have the pixel value of 0.

12. The non-transitory computer-readable storage medium according to claim 7, wherein the performing the deconvolution transform on the Laplacian image to obtain the fused image comprises:
performing discrete cosine transform on the Laplacian image L 'to obtain DL';
acquiring a width Width and a height Height of the Laplacian image L, created an image and denoting the image as T, a width and a height of the image being respectively 2Width and 2Height, assigning a value of (−4+ε) to a center position (Width, Height) of the image, assigning a value of 1 to positions (Width+1, Height), (Width−1, Height), (Width, Height+1), (Width, Height−1) respectively, and assigning a value of 0 to other positions of the image;
performing discrete Fourier transform on T to obtain an image $T_1$;
acquiring an image of a real part of an upper left quarter of $T_1$ (0≤u<Width, 0≤v<Height) and denoting the image as $T_2$;
changing $T_2(u,v)$ to $-T_2(u,v)$ at a position where u+v is an odd number to obtain $T_2'(u,v)$ by using a formula (7):

$$T_2'(u, v) = \begin{cases} T_2(u, v) & u + v \text{ is even} \\ -T_2(u, v) & u + v \text{ is odd} \end{cases}; \quad (7)$$

DL' is divided by $T_2'$ to obtain DL, as shown in a following formula (8):

$$DL(u, v) = \frac{DL'(u, v)}{T_2'(u, v)}; \quad (8)$$

performing inverse discrete cosine transform on DL to obtain the fused image resL at a low resolution;
using a relationship between the resL image and multiple down-sampled images to obtain multiple corresponding ratio images, up-sampling the ratio images by m times, and performing a point multiplication operation between the up-sampled ratio images and inputted original images, and then fusing through corresponding mask images to obtain the panoramic image which is clear and has no color difference and brightness difference.

13. A portable terminal, comprising:
one or more processors;
a memory; and
one or more computer programs, wherein the one or more computer programs are stored in the memory and configured to be executed by the one or more processors, the processors being programmed to execute the computer programs to perform operations including:

acquire a plurality of aligned images;
calculate gradient information of each image respectively;
set a mask image of each image and generate a target gradient image;
perform a gradient operation on the target gradient image to obtain a target Laplacian image;
perform a deconvolution transform on the Laplacian image to generate a fused panoramic image;
wherein,
the plurality of aligned images are capable of being stitched into one panoramic image, and a number of the aligned images is equal to n, with n≥2;
the aligned images represent that any pixel in the n aligned images corresponds to a pixel in the panoramic image obtained by stitching;
wherein the calculate the gradient information of each image respectively comprises:
down-sample each image sequentially to obtain a corresponding down-sampled image;
calculate horizontal forward gradient information, vertical forward gradient information, horizontal backward gradient information and vertical backward gradient information of each down-sampled image respectively.

14. The portable terminal according to claim 13,
wherein the calculating the gradient information of a coordinate (u,v) of a pixel comprises:
calculating the horizontal forward gradient information $g_x$ with a formula (1):

$$g_x(u, v) = \begin{cases} I(u+1, v) - I(u, v) & \text{if } u < \text{Width} - 1 \\ 0 & \text{if } u = \text{Width} - 1 \end{cases} ; \quad (1)$$

calculating the vertical forward gradient information $g_y$ with a formula (2):

$$g_y(u, v) = \begin{cases} I(u, v+1) - I(u, v) & \text{if } u < \text{Height} - 1 \\ 0 & \text{if } u = \text{Height} - 1 \end{cases} ; \quad (2)$$

calculating the horizontal backward gradient information $g_x^b$ with a formula (3):

$$g_x^b(u, v) = \begin{cases} g_x(u-1, v) & \text{if } u > 0 \\ 0 & \text{if } u = 0 \end{cases} ; \quad (3)$$

calculating the vertical backward gradient information $g_y^b$ with a formula (4):

$$g_y^b(u, v) = \begin{cases} g_y(u, v-1) & \text{if } v > 0 \\ 0 & \text{if } v = 0 \end{cases} ; \quad (4)$$

wherein, (u,v) is the coordinate of the pixel, I is a pixel value, g is the gradient information of the pixel, Width is a width of an image, and Height is a height of an image.

15. The portable terminal according to claim 13, wherein the setting the mask image of each image and generating the target gradient image comprises setting the mask image of each image through a fixed mask or a dynamic mask according to different stitching manners.

16. The portable terminal according to claim 15, wherein the setting the mask image of each image through the dynamic mask and generating the target gradient image comprises:
creating a four channels image with the same length and width as the panoramic image, wherein the four channels are configured to store the horizontal forward gradient information, the vertical forward gradient information, the horizontal backward gradient information, and the vertical backward gradient information;
copying gradient information of an area covered by the mask image of each image to the created image and generating the target gradient image.

17. The portable terminal according to claim 13, wherein the performing the gradient operation on the target gradient image to obtain the target Laplacian image comprises:
calculating the Laplacian image according to four gradient information of the target gradient image by using a calculation formula (5):

$$L(u,v) = g_x(u,v) - g_x^b(u,v) + g_y(u,v) - g_y^b(u,v); \quad (5)$$

for the Laplacian image, adding a small component of a brightness value of the original image by using a calculation formula (6):

$$L'(u, v) = L(u, v) + \varepsilon \sum_{i=1}^{N} I_i(u, v) M_i(u, v); \quad (6)$$

wherein, N is a total number of images, $I_i$ is the i-th original image, $M_i$ is a mask image of the i-th image, the pixel value is 1 when the pixel is effective pixel, otherwise the pixel value is 0; $M_i$ ensures that for each pixel (u,v), only one of N images has the pixel value of 1, and the rest have the pixel value of 0.

18. The portable terminal according to claim 13, wherein the performing the deconvolution transform on the Laplacian image to obtain the fused image comprises:
performing discrete cosine transform on the Laplacian image L' to obtain DL';
acquiring a width Width and a height Height of the Laplacian image L, created an image and denoting the image as T, a width and a height of the image being respectively 2Width and 2Height, assigning a value of (−4+ε) to a center position (Width, Height) of the image, assigning a value of 1 to positions (Width+1, Height), (Width−1, Height), (Width, Height+1), (Width, Height−1) respectively, and assigning a value of 0 to other positions of the image;
performing discrete Fourier transform on T to obtain an image $T_1$;
acquiring an image of a real part of an upper left quarter of $T_1$ (0≤u<Width, 0≤v<Height) and denoting the image as $T_2$;
changing $T_2(u,v)$ to $-T_2(u,v)$ at a position where u+v is an odd number to obtain $T_2'(u,v)$ by using a formula (7):

$$T_2'(u, v) = \begin{cases} T_2(u, v) & u + v \text{ is even} \\ -T_2(u, v) & u + v \text{ is odd} \end{cases} ; \quad (7)$$

DL' is divided by $T_2'$ to obtain DL, as shown in a following formula (8):

$$DL(u, v) = \frac{DL'(u, v)}{T_2'(u, v)}; \quad (8)$$

performing inverse discrete cosine transform on DL to obtain the fused image resL at a low resolution;

using a relationship between the resL image and multiple down-sampled images to obtain multiple corresponding ratio images, up-sampling the ratio images by m times, and performing a point multiplication operation between the up-sampled ratio images and inputted original images, and then fusing through corresponding mask images to obtain the panoramic image which is clear and has no color difference and brightness difference.

* * * * *